March 1, 1949.  C. E. MONGAN, JR  2,462,988
METHOD OF MAKING ALL-GLASS SEALED PACKAGES
Filed May 22, 1943  2 Sheets-Sheet 1
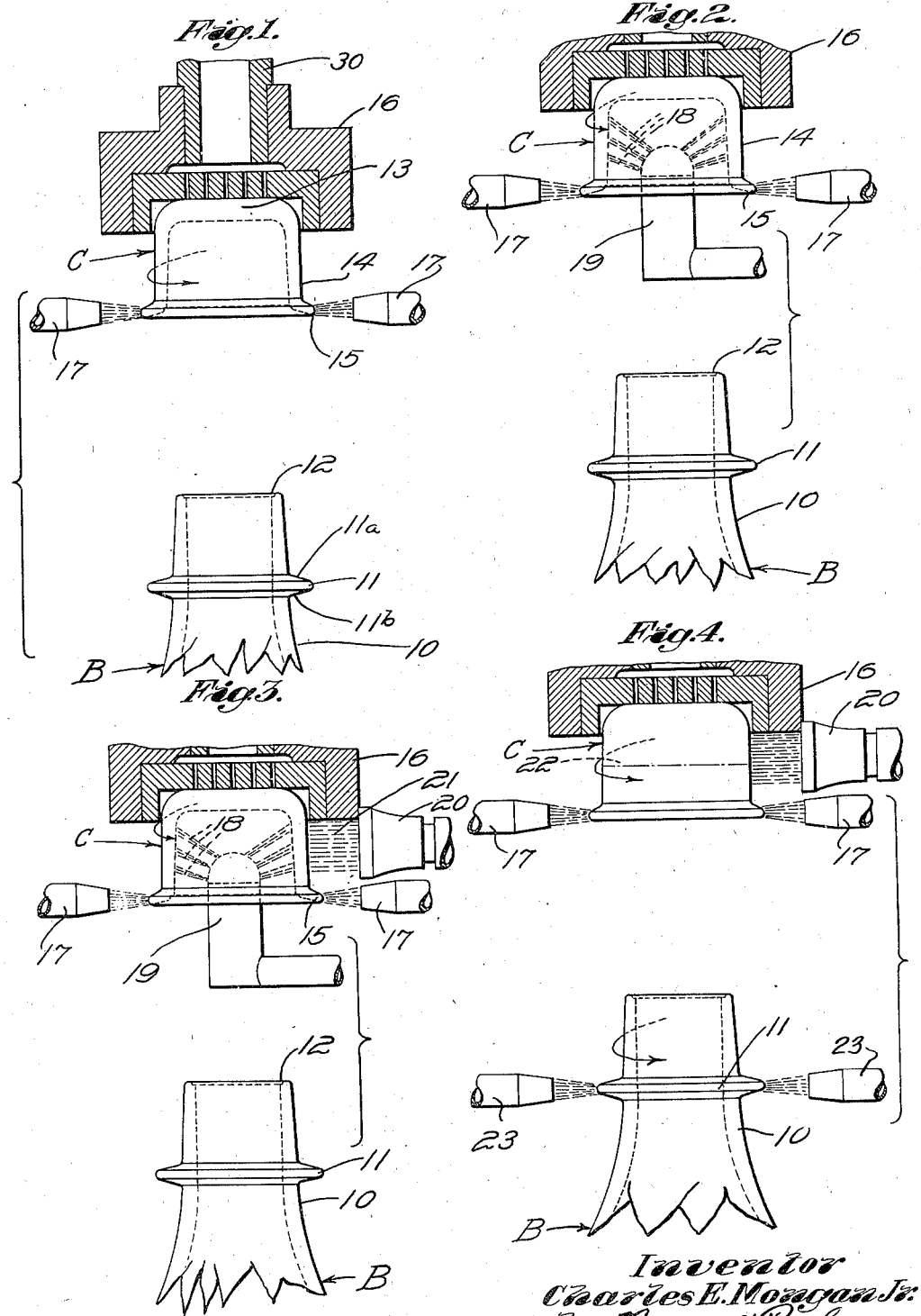

March 1, 1949.   C. E. MONGAN, JR   2,462,988
METHOD OF MAKING ALL-GLASS SEALED PACKAGES
Filed May 22, 1943   2 Sheets-Sheet 2
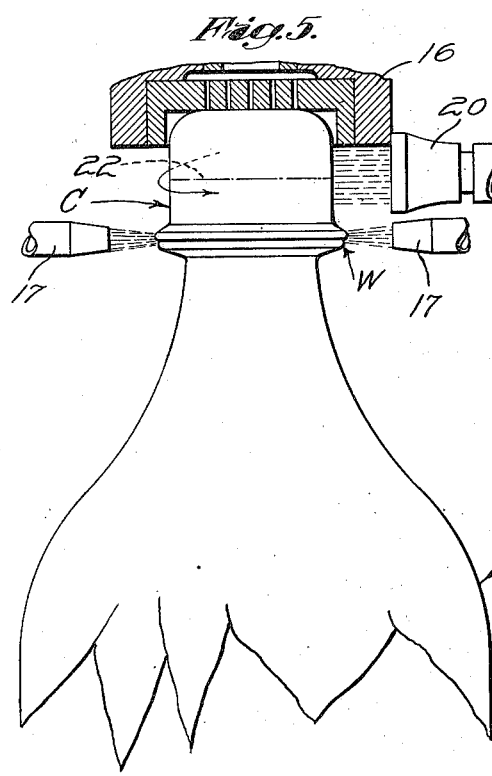
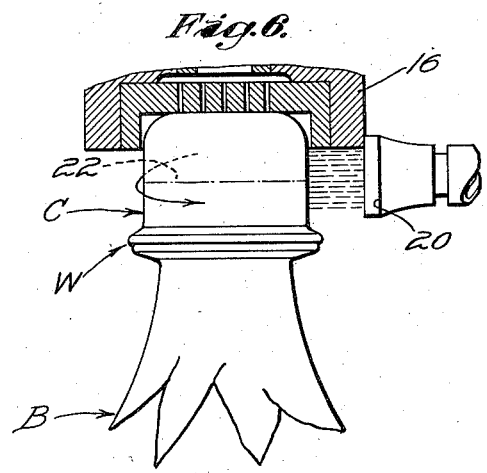
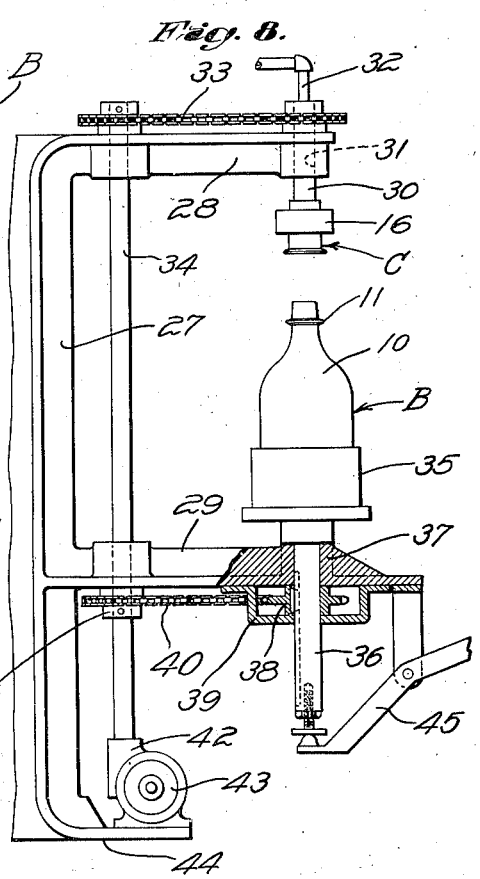
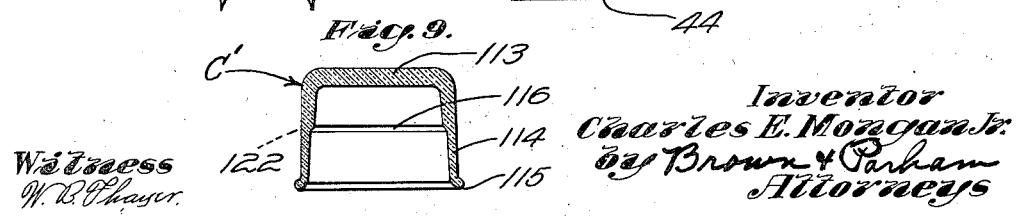
Witness
W. R. Thayer.
Inventor
Charles E. Mongan Jr.
by Brown & Parham
Attorneys Patented Mar. 1, 1949

2,462,988

UNITED STATES PATENT OFFICE 2,462,988

METHOD OF MAKING ALL-GLASS SEALED PACKAGES

Charles E. Mongan, Jr., Hartford, Conn., assignor to Hartford-Empire Company, Hartford, Conn., a corporation of Delaware Application May 22, 1943, Serial No. 488,063

5 Claims. (Cl. 49—79)

This invention relates generally to improvements in sealed packages, especially those comprising glass containers, and to methods of making or producing such packages.

An object of the invention is to provide an all-glass sealed package comprising a plurality of initially separate complementary glass parts welded or fused together and adapted to be opened at will simply by scratching or otherwise injuring the outer surface of the glass of the package at any point along a line extending around a portion of the sealed package.

Another object of the invention is to provide an all-glass sealed package comprising a glass container and a glass closure therefor permanently united to provide a hermetic seal and wherein the closure includes a skirt surrounding the original open end portion of the glass container and provided with a line of strain extending circumferentially thereof so located and of such a character that, merely by scratching the outer surface of the glass thereof at any point along that line, the portion of the closure covering the open end portion of the container will be separated from the remainder of the package, leaving the original container intact.

A further object of the invention is to provide a sealed package of the character described which cannot be re-used after having once been opened without this fact being apparent to an observer.

A further object of the invention is to provide a practical, readily usable and reliable method of producing an all-glass sealed package.

Other objects and advantages of the invention will hereinafter be pointed out or will become apparent from the following description of an all-glass sealed package embodying the invention and of a practical method of producing the same. Successive steps of this illustrative method and instrumentalities suitable for use in the performance thereof are illustrated in the accompanying drawings, in which:

Fig. 1 is a fragmentary view, mainly in elevation and partly in vertical section, showing the neck portion of a glass bottle and a cap for the same in the relative positions which these parts may occupy at an early stage in the operation of producing an all-glass sealed package in accordance with the present invention, the view also showing burners for heating the rim portion of the cap and a suction chuck or holder for rotatably supporting the cap during the performance of the method;

Fig. 2 is a view similar to Fig. 1 but showing conditions at a later stage of the method, at which a cooling nozzle is used to apply a chilling fluid to the interior of the cap to set up a line of strain extending around the skirt portion of the cap;

Fig. 3 is a similar view, showing conditions at a still later stage of the method, at which an external cooling nozzle also is used to apply cooling fluid to the outer surface of the skirt of the cap;

Fig. 4 is a similar view, showing conditions at a still later stage in the performance of the method, at which time the internal cooling nozzle has been removed and burners are also being used to heat an external flange on the bottle neck;

Figs. 5 and 6 are views generally similar to the preceding views showing conditions at two different stages of the operation of effecting the junction or fusion of the rim portion of the cap and the external flange on the bottle neck;

Fig. 7 is a fragmentary vertical sectional view, showing the cap fused or welded at its rim to the flange on the bottle neck and showing a heat-confining ring member surrounding the weld;

Fig. 8 is a fragmentary view, mainly in elevation and partly in section, of a simple form of apparatus for rotatably supporting the glass bottle and its glass cap in vertical alignment with each other and for effecting relative movement between them to apply the cap to the bottle in position to be welded in place thereon; and Fig. 9 is a vertical section through a modified form of cap suitable for use with the bottle shown in the preceding views.

In a broad sense, the invention contemplates making a hermetically sealed hollow glass article by permanently uniting two complementary cooperative glass sections or parts of the complete article desired and providing a line of strain around the article in the wall thereof so that separation of the article into two parts may be effected at will simply by intentionally scratching or injuring the outer surface of the glass article at this line.

One of the above-mentioned component glass sections may be a glass container, such as a bottle, of generally conventional form and the cooperative section may be a glass closure, such as a cap, suitable for application to that container. In the practical embodiment of the invention shown in the accompanying drawings, the closure is a cap of the hood type, having a skirt portion fitting over the open end portion of the neck of a bottle against an external flange on the bottle neck. The skirt of the cap is welded at its rim to this flange and the line of strain is set up in the skirt of the cap so that the glass package may be opened simply by cracking off and removing the portion of the cap that is located above the line of strain when the package is upright. A feature of advantage of a glass package of this kind is that the wall of the container at the open end or mouth thereof may be left intact when the package is opened and the contents of the container poured or otherwise removed therefrom substantially as in the case of a bottle that had been closed by a completely removable cork or other known bottle closure. The line of strain at which the upper portion of the glass cap may be cracked off may be located below the level of the mouth of the bottle component of the sealed package when the latter is upright. This will allay any fear on the part of a user that glass might be thrown or dropped into the bottle when the separable part of the cap is cracked off to open the package.

A glass bottle suitable for use as the container component of my novel all-glass package may be of a generally conventional form, as shown best in Fig. 8 in which the bottle is generally designated B. The bottle B has a neck portion 10 provided with an external flange 11 thereon. This flange is located at a predetermined distance from the plane of the open end or mouth 12 of the bottle. This flange may decrease in thickness toward its outer peripheral edge, as by being formed with an outwardly and downwardly inclined upper surface 11—a and an outwardly and upwardly inclined lower surface 11—b as shown best in Figs. 1 to 4, incl., although this is not essential.

The closure component of my novel all-glass sealed package may be a glass cap of the hood type, designated C in Figs. 1 to 8, incl. This cap has a head portion 13 and a skirt portion 14 which may be formed with an outwardly and downwardly flaring rim or free edge portion 15. The cap C is adapted to fit over the upper end portion of the bottle so that it may rest at its rim portion 15 on the flange 11. Preferably the cap is of sufficiently large internal dimensions to be out of contact with the glass bottle neck at all points although this is not essential.

As a preliminary step in the operation of applying the cap to the bottle and welding it in place thereon, both the neck portion of the bottle and the cap may be preheated in a suitable heating furnace or furnaces (not shown) so as to reduce substantially the time required for further localized heating of the rim portion of the cap and the flange of the neck portion of the bottle, as hereinafter described. The temperature to which the neck portion of the bottle and the cap will be preheated may vary considerably because of different factors involved, such as the nature of the substance in or to be placed in the bottle, the composition of the glass involved, the thickness and shape of the walls of the glass components of the package, etc. Such temperature may be in the order of 400° F. to 500° F. but may be considerably higher or lower. Any preheating of any portion of the bottle should of course be restricted to such as will not overheat or otherwise objectionably affect the contents of the bottle.

The bottle and cap are then disposed in vertically spaced aligned relation with the cap above the bottle substantially as shown in Fig. 1. At this time the cap may be held by a rotary open-bottomed suction chuck or holder 16. The bottle may be supported in an upright position by an open topped cup-shaped rotary holder 35, such as that shown in Fig. 8. Flames, as from opposed burners 17, may be applied to the rim portion 15 of the rotating cap to heat such rim portion to the temperature required for the subsequent welding operation. Heat from these flames, applied to the rim portion 15 of the rotating cap substantially as shown in Fig. 1, also will be effective to heat the glass of the skirt portion 14 of the cap and such heating may be continued until the temperature of such glass at both the internal and external surfaces of the skirt portion is above the strain point of the glass.

At the stage of operations shown in Fig. 2, flames from the burners 17 are still being applied to the rim portion 15 of the rotating cap. At this time, jets of a cooling fluid, indicated at 18, are applied to the inner side wall of the skirt of the cap, as from a cooling nozzle 19 which projects upwardly into the cap. This is for the purpose of locally chilling the skirt of the cap at its inner surface from a temperature above the strain point of the glass to a temperature below such strain point in advance of a like cooling of the opposite or outer surface of the skirt so as to set up in the wall of the skirt permanent stresses which will place the inner surface of the skirt under compression and the outer surface of the skirt under tension so that it may be divided cleanly along a line extending circumferentially thereof at the desired place simply by scratching or otherwise slightly injuring the outer surface of the glass at any place along that line. The line of tension, in the example referred to and illustrated in the drawings, will be located at a level approximately intermediate those of the upper and lower limits, respectively, of the zone of local chilling of the inner surface of this skirt by the jets 18. The exact location of this line may, of course, be determined in any suitable known manner, as by the use of a polariscope.

At the stage of operations shown in Fig. 3, the rim of the cap is still being heated by flames from the burners 17. Cooling jets 18 from the nozzle 19 are still being applied to the inner surface of the skirt of the cap. In addition, cooling air from an external nozzle 20 is now being applied, as indicated at 21, to the outer surface of the skirt of the cap.

At the stage of operation shown in Fig. 4, cooling of the skirt of the cap at its inner surface has been discontinued as a line of tension has been set up at the outer surface of the skirt so that the latter may be divided in the manner above described, as at the level indicated at 22. The rim portion 15 of the cap is still receiving heat from burners 17 and the external cooling nozzle 20 is still being employed to prevent overheating of the skirt of the cap. At this stage of operations, the flange 11 on the neck of the bottle is also being heated, as by flames from burners 23.

Fig. 5 shows the relation of the parts after the cap and the bottle have been moved relatively to each other to set the rim portion of the cap on the flange of the bottle. It will be understood that both the rim portion of the cap and the flange on the bottle neck will have been heated to a suitable welding temperature, as to the softening temperature of the glass thereof, at the time the cap is applied to the bottle. The cap and the bottle may be pressed together under sufficient pressure to assure the desired flowing together of the glass of these two parts at the weld W. Heat from the burners 17 may be applied to the weld and both the bottle and the cap may be rotated in unison. Cooling air from the nozzle 20 may be applied to the outer surface of the skirt of the cap to prevent overheating of the same.

Fig. 6 shows a continuation of the treatment at the time the cap is welded to the bottle. At this stage, heating of the weld may have been discontinued. Cooling air from the external nozzle 20 may be continued however to keep the temperature of the skirt of the cap suitably low so that the line of tension at the outer surface of the skirt of the cap will not be impaired.

After the operation of applying the cap to the bottle, and welding it in place thereon has been completed, substantially as above described, a preheated annular two-part annealing ring 24 may be disposed in spaced encircling relation to the weld, as shown in Fig. 7. This arrangement provides an annular space 25 surrounding the weld to and through which heat from the weld may pass at a retarded, substantially uniform rate. Annealing of the weld and of the immediately adjacent relatively hot portions of the bottle neck and cap thus may be effected in a simple but effective way. The more remote portions of the bottle neck and cap are not shielded by the annealing ring and may cool freely in the surrounding air so that the strained condition of the portion of the cap skirt at the level 22 will be unimpaired.

If desired, the mouth of the bottle may have been closed in any suitable known manner when the cap is applied so as to prevent any of the contents of the sealed package leaking past the mouth of the bottle into the narrow space 26 between the skirt of the cap and the enclosed bottle neck.

A simple form of bottle capping apparatus suitable for use in practicing the method of the invention is shown in Fig. 8. This apparatus comprises a supporting frame 27 having laterally extending upper and lower supporting arms 28 and 29, respectively. A vertical shaft 30 is journaled at 31 in a bearing at the outer end portion of the arm 28 and carries at its lower end the suction holder or chuck 16. The shaft 30 may be hollow, as shown in Fig. 1 and suction may be applied therethrough from a pipe 32 to the interior of the suction chuck so that the latter may be rendered effective to hold the cap C when desired. The suction chuck and its hollow shaft 30 may be rotated about the vertical axis of the chuck, as by a chain and sprocket driving connection 33 with a vertical driven shaft 34 that extends through aligned bearings in portions of the arms 28 and 29.

The bottle B may rest in the substantially open-topped cup-shaped holder 35 on the upper end of a vertically movable rotary vertical shaft 36. The shaft 36 is rotatable in and vertically movable relative to a bearing 37 in the outer end portion of the supporting arm 29. The shaft 36 also extends through a driven sprocket 38, being feathered to the latter. The sprocket 38 is rotatably supported in a casing 39, carried by the supporting arm 29, and is connected by a chain 40 with a sprocket 41 on the vertical driven shaft 34. The shaft 34 is driven, as by a speed reduction unit 42, by a motor 43, carried by a base portion 44 of the supporting frame 27. The structural and operating arrangements are such that the holder 35 for the bottle B and the chuck 16 for the cap C are rotated in unison about the same vertical axis at the same speed. The shaft 36 may be raised, as by a lever 45, to lift the bottle neck into the cap and to press the rim of the cap and the flange on the bottle neck together at the proper time to assure satisfactory welding together of these parts.

Fig. 9 shows a modified form of cap C', having a head portion 113 and a skirt 114. The skirt has an outwardly flaring rim portion 115. The inner wall of the skirt is formed to have a shoulder at 116, the thickness of the wall of the skirt being abruptly decreased at that level to the edge of the cap. This cap is adapted to be applied to the bottle B the same as the cap shown in Figs. 1 to 7, inclusive. The strain line may be placed in this cap, as at 122, in the manner previously described. The location of this strain line may be indicated by the internal shoulder 116.

The instrumentalities hereinbefore referred to as being used in the performance of the method of the invention to apply the cap C to the bottle B and to weld it in place thereon may be supported and operated in any suitable known way or ways for use with the capping apparatus shown in Fig. 8. Any other suitable apparatus may be used to carry out the method of the invention. In actual practice, a more fully automatic and more rapid machine probably would be used to cap and seal bottles in accordance with the method of the present invention. The details of such a machine do not form part of the present invention and hence need not be described herein.

The cap may be processed in advance of the capping and sealing operation to set up the desired line of tension therein. In this event, necessary cooling of the cap skirt should be effected during the capping and sealing operation to prevent impairment of the strained condition of the cap.

The all-glass sealed packages of the present invention may be used for food products and other substances as in the case of conventional glass containers and usual closures of the prior art. When the cap has been applied to the container and has been welded in place on the neck portion of the latter, the package will of course be in effect but one single piece. When it is desired to remove the contents of the package, it is only necessary to scratch the outer surface of the cap at the strain line and the cap will divide cleanly along a circumferential division line into an outer detached head portion and the remaining welded rim portion of the original cap. On removal of the head portion of the cap, the mouth of the glass container will be exposed and will be in its original condition. The contents of the container may then be removed through this mouth. It will be obvious that when the sealed package has been opened in this manner, it cannot be re-used without the fact of re-use being apparent to an observer.

I claim:

1. The method of producing an all-glass, openable, sealed package which comprises providing two separate cooperative complementary hollow glass sections which respectively have open-end portions adapted to be welded together when the sections are cooperatively associated, each with the other, the sections being otherwise closed, to form a one-piece hermetically sealed, hollow glass article, heating at least a portion of one of said sections throughout its entire circumference to a temperature above the strain point of the glass thereof before said sections are cooperatively associated with each other, then cooling the thus heated portion by first applying a cooling fluid locally to its inner surface and thereafter to its opposite, outer surface, rapidly to lower the temperature of said inner surface below said strain point in advance of cooling of the outer surface so as to place the outer surface in tension at a line extending circumferentially thereof, whereby the article may be divided transversely at that line simply by scratching or otherwise slightly injuring the outer surface of the glass there, and finally cooperatively associating said sections with each other and welding their open-end portions together while the outer surface of said one section remains in tension at said line extending circumferentially thereof.

2. The method of producing an all-glass, openable, sealed package which comprises heating at least a portion of a glass cap for a glass container throughout its entire circumference to a temperature above the strain point of the glass thereof, then cooling the thus heated portion by first applying a cooling fluid locally to its inner surface and thereafter to its opposite, outer surface rapidly to lower the temperature of said inner surface below said strain point in advance of cooling of the outer surface so as to place the outer surface of glass of said portion in tension at a line extending circumferentially thereof, whereby said cap may be divided transversely along said line simply by scratching or otherwise slightly injuring the tensionally strained outer surface glass at any place along that line, and permanently uniting the cap to the glass container in applied, sealing position on the latter while said cap is tensionally strained at a portion of its outer surface as aforesaid.

3. The method of producing an all-glass, openable, sealed package from a glass container having a neck portion formed with an external flange thereon at a level spaced from the outer end of the neck portion and a glass cap for the container having a skirt terminating in a rim portion, said skirt being adapted to fit over the neck portion of the glass container so that said rim portion bears against said flange when said cap has been applied to said container, said method comprising the steps of heating at least a portion of the skirt of said cap throughout its entire circumference to a temperature above the strain point of the glass thereof while said cap is off the container, then cooling the thus heated portion by first applying a cooling fluid locally to its inner surface and thereafter to its opposite, outer surface to chill said inner surface rapidly below said strain point in advance of cooling of the outer surface so as to place the outer surface glass of said portion in tension at a line extending circumferentially thereof, whereby the cap may be divided cleanly along said line simply by scratching or otherwise slightly injuring the tensionally strained outer surface glass at said line, applying said cap to said container and welding the rim portion of the skirt of the cap to the flange on the neck portion of the glass container to which the cap has been applied while the outer surface of said portion of the skirt of the cap remains in tension at said line extending circumferentially thereof.

4. The method of producing an all-glass, openable, sealed package from a glass container having a neck portion formed with an external flange thereon at a level spaced from the outer end of the neck portion and a glass cap for the container having a skirt terminating in a rim portion, said skirt being adapted to fit over the neck portion of the glass container so that said rim portion bears against said flange when said cap has been applied to said container, said method comprising the steps of heating at least a portion of the skirt of said cap throughout its entire circumference to a temperature above the strain point of the glass thereof while said cap is off the container, then cooling the thus heated portion by first applying a cooling fluid locally to its inner surface and thereafter to its opposite, outer surface to chill said inner surface rapidly below said strain point in advance of cooling of the outer surface so as to place the outer surface glass of said portion in tension at a line extending circumferentially thereof, whereby the cap may be divided cleanly along said line simply by scratching or otherwise slightly injuring the tensionally strained outer surface glass at said line, applying said cap to said container welding the rim portion of the skirt of the cap to the flange on the neck portion of the glass container to which the cap has been applied, while the outer surface of said portion of the skirt of the cap remains in tension at said line extending circumferentially thereof and annealing the welded together portions of said cap and said container without substantially altering the condition of tension in the outer surface glass in the skirt of said cap by disposing an open-ended annealing ring in spaced encircling relation to the welded together portions only of said cap and said container to restrict the cooling thereof to a retarded, substantially uniform rate.

5. The method of producing an all-glass openable, sealed package which comprises providing a glass container having an open end portion formed with an external flange thereon relatively adjacent to but spaced from the extremity of said open end portion and a glass cap for the container having a skirt terminating in a rim portion, said skirt being adapted to fit over said open end portion of the container so as to position said rim portion against said flange when said cap has been applied to said container, applying a heating flame to said rim portion of the skirt before the cap has been applied to the container to prepare said rim portion for subsequent welding to said container flange and to effect heating of at least a portion of the skirt of said cap throughout its entire circumference to a temperature above the strain point of the glass thereof, then cooling the thus heated portion of the skirt by first applying a cooling fluid locally to its inner surface and thereafter to its opposite, outer surface to chill said inner surface rapidly below said strain point in advance of cooling of the outer surface so as to place the outer surface glass of said portion of the skirt in tension at a line extending circumferentially thereof, whereby the cap may be divided cleanly along said line simply by scratching or otherwise slightly injuring the tensionally strained outer surface glass at said line, applying said cap to said container and welding the rim portion of the skirt of the cap to the flange on the container while preserving the outer surface glass of said portion of the skirt in tension at said line extending circumferentially thereof.

CHARLES E. MONGAN, Jr.

(References on following page)

REFERENCES CITED

The following references are of record in the file of this patent:

UNITED STATES PATENTS

| Number | Name | Date |
|---|---|---|
| 562,243 | Riley | June 16, 1896 |
| 573,760 | Bultman | Dec. 22, 1896 |
| 1,024,917 | Trexler | Apr. 30, 1912 |
| 1,190,708 | Bennett | July 11, 1916 |
| 1,475,908 | Walsh | Nov. 27, 1923 |
| 1,713,854 | Meyer | May 21, 1929 |
| 2,009,738 | Kuenstler | July 30, 1935 |
| 2,177,324 | Long | Oct. 24, 1939 |
| 2,177,336 | Shaver et al. | Oct. 24, 1939 |
| 2,244,715 | Long | June 10, 1941 |
| 2,269,060 | Mitford | Jan. 6, 1942 |
| 2,285,595 | Littleton et al. | June 9, 1942 |
| 2,296,579 | Seelen | Sept. 22, 1942 |

FOREIGN PATENTS

| Number | Country | Date |
|---|---|---|
| 536,858 | Great Britain | May 29, 1941 |
| 323,394 | Italy | Dec. 19, 1934 |